United States Patent
Kuriyama et al.

(10) Patent No.: US 6,865,045 B2
(45) Date of Patent: Mar. 8, 2005

(54) METHOD AND SYSTEM FOR WRITING DATA ON A MAGNETIC TAPE

(75) Inventors: Tetsuo Kuriyama, Fujisawa (JP); Masahiro Shioya, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 284 days.

(21) Appl. No.: 10/298,629

(22) Filed: Nov. 18, 2002

(65) Prior Publication Data
US 2003/0095351 A1 May 22, 2003

(30) Foreign Application Priority Data
Nov. 20, 2001 (JP) ......................... 2001-354820

(51) Int. Cl.⁷ ............................................. G11B 15/04
(52) U.S. Cl. ......................................... 360/60; 711/162
(58) Field of Search ................................ 360/60; 711/162, 711/164; 707/204; 714/6

(56) References Cited
U.S. PATENT DOCUMENTS
6,714,953 B2 * 3/2004 Grubbs et al. .............. 707/205
* cited by examiner

Primary Examiner—Alan T. Faber
(74) Attorney, Agent, or Firm—Jean M. Barkley; Dillon & Yudell LLP (57) ABSTRACT

In a magnetic tape storage controlled by a server, three attributes, namely, "read/write," "read only" and "protection" are provided for data to be written, and each magnetic tape is set to a mode in which multiple attributes can be handled or a mode in which only one attribute can be handled. By properly selecting an attribute and a mode, a backup state depending on the importance of data is achieved.

22 Claims, 7 Drawing Sheets

BACKUP

┌─ TAPE MODE ──────────────────────────────┐
│  ○ MIXED ATTRIBUTE    ○ NON-MIXED ATTRIBUTE │
└──────────────────────────────────────────┘

TAPE NAME : Tape01

┌─ BACKED UP DATA ─────────────────────────┐
│   DATA NAME      DATA SIZE     ATTRIBUTE │
│       A1            7M            OOO    │
│       A2            3M            OOO    │
│       A3           10M            OOO    │
│        ⋮            ⋮              ⋮     │
└──────────────────────────────────────────┘

FREE CAPACITY : OOOM

┌─ DATA ATTRIBUTE ─────────────────────────┐
│  ○ READ/WRITE                            │
│  ○ READ ONLY                             │
│                    USER ID : ______      │
│  ○ PROTECTION                            │
│                    PASSWORD : ______     │
└──────────────────────────────────────────┘

( BACKUP )   ( SELECT BACKUP DATA )   ( CANCEL )

FIG. 3

RESTORE

TAPE NAME : Tape01       MODE : ○○○○

| DATA NAME | ATTRIBUTE | DATE AND TIME OF WRITING |
|---|---|---|
| A1 | ○○○ | 10/01/2001 |
| A2 | ○○○ | 10/03/2001 |
| A3 | ○○○ | 10/08/2001 |
| ⋮ | ⋮ | ⋮ |

USER ID : _________
PASSWORD : _________

RESTORE DESTINATION : ×××××××

[ RESTORE ]     [ CANCEL ]

METHOD AND SYSTEM FOR WRITING DATA ON A MAGNETIC TAPE

RELATED PATENT APPLICATION

The present patent application claims priority to co-pending Japanese Application No. 2001-354820, filed on Nov. 20, 2001.

BACKGROUND OF THE INVENTION

1. Technical Field

The present invention relates to a method and system for recording data on a recording medium in general, and in particular to a method and system for writing data on a magnetic tape.

2. Description of the Related Art

A magnetic tape recording device can provide data backup for a network system or data base system. Magnetic tape recording devices are commonly referred to as tape storage. One drawback of magnetic tape recording devices is that random access cannot be performed on the devices and a long time is required to write and read data to and from the devices. However, magnetic tape recording devices, unlike hard disk drives, seldom crash to become unusable and hence very reliable. Further, magnetic tape recording device is relatively inexpensive. As such, magnetic tape recording devices are still being widely used for data backup.

There are various types of magnetic tapes of which a cartridge type is commonly used. Usually, the magnetic tape recording device is connected to a network attached storage (NAS) or a computer through a SCSI port or a fiber channel port. The magnetic tape recording device has a property that when data are overwritten with new data on a magnetic tape, all data recorded at the positions subsequent to the position at which the new data are written are deleted.

Figure 10:
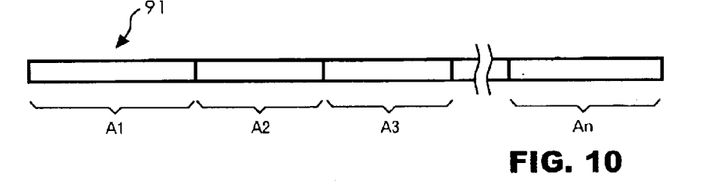
FIG. 10 illustrates a state that data are recorded on a magnetic tape, according to the prior art.

FIG. 10 shows a magnetic tape 91 on which data A1, A2, A3 to An are recorded. These data are successively written and recorded on the magnetic tape 91 in the order of A1, A2, A3 to An. It is assumed that daily available data used daily are recorded on the magnetic tape 91, such as customer data A1, sales data A2, and customer claim data A3. It is also assumed that the data are backed up after daily business hours and the magnetic tape 91 is replaced when the capacity of the magnetic tape 91 becomes small (usually, the magnetic tape is replaced when data are updated at predetermined times on the basis of a rough estimate from the amount of data updated daily).

Figure 11:
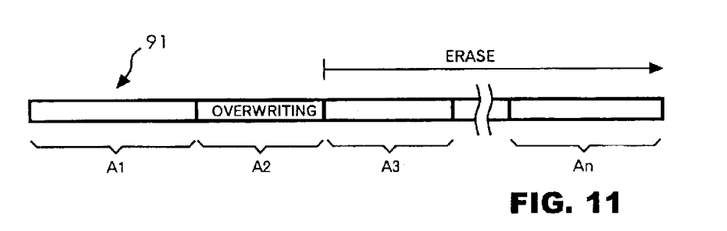
FIG. 11 illustrates a state that data are overwritten on a magnetic tape, according to the prior art.

Consider a case when an error is found in the data contents of A2 which is then corrected and overwritten. The magnetic tape 91 is loaded in a recording device and the data A2 are read out on a terminal to correct the error. FIG. 11 shows a state where the data A2 is overwritten on the magnetic tape 91 of FIG. 10. In the recording device using the magnetic tape 91, all the data A3 and subsequent data are deleted when the data A2 are overwritten. That is, as shown in FIG. 11, the overwriting of the data A2 causes the data A3 to An to be deleted.

When the overwriting (rewriting) of the contents of the data A2 is carried out under the state that the data A1 to An are recorded on the magnetic tape, the data A3 and subsequent data, that is, the data A3 to An are automatically deleted. Such an operation is carried out to prevent occurrence of a situation described in detail below. From a structural limitation standpoint, the magnetic tape cannot perform an operation of writing a piece of data at a random position (although it is not impossible to write a piece of data at a random position, it is impractical to do so because the rotational speed of the magnetic tape has a limit, resulting in a longer write time). Therefore, data are written on a magnetic tape sequentially from its start portion toward its end portion. Accordingly, when an overwriting operation is carried out on data recorded at some midpoint of the magnetic tape, the overwriting would extend to an area storing the next data if the overwriting data volume is larger than the original data volume before the overwriting.

Figure 12:
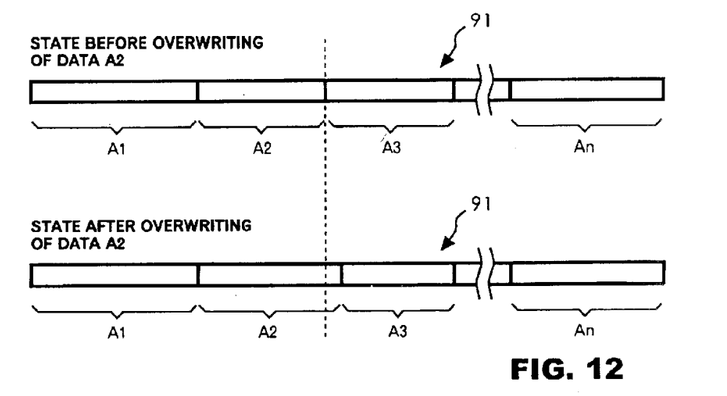
FIG. 12 illustrates a data overwriting state according to the prior art.

FIG. 12 shows a state in which the original data A2 written on the magnetic tape 91 are overwritten, and a leading portion of the data A3 is deleted because the amount of overwriting data is large. Thus, it is no longer possible to read out the data A3. Particularly, since information such as data name is written at the leading portion or header of the data, it becomes impossible to identify and access the data if the header portion is deleted. Further, if the header of the data A3 is deleted and a computer attempting to read cannot recognize the data A3, the following problem would occur. That is, when the newly overwritten data A2 is read out, a part of the data A3 is also read out after the data A2, and thus the overwritten data A2 cannot be read out correctly.

In order to prevent occurrence of such a situation, the magnetic tape recording device is designed to delete the data A3 to An when the data A2 is overwritten. Such deletion occurs even when the data A2 is slightly modified. Further, when the magnetic tape recording device is shared by multiple users, new data might be accidentally written on the data A2 which should be left intact.

One method for preventing occurrence of the situation described above may be the one which prohibits any subsequent data writing once data are written. For example, the magnetic tape itself may be write-protected. With such method, however, when the amount of written data is small, an unused portion of the magnetic tape is wasted. Also, with such method, many users cannot share the magnetic tape. Further, with such method, even when multiple magnetic tapes are provided so that multiple users can use them, unused portions of these magnetic tapes would be large and thus wasteful. In addition, with such method, write protection of a magnetic tape has to be set one by one at the recording device side that is inconvenient when the recording device is placed in another room.

Consequently, it would be desirable to provide an improved method for storing data in a magnetic tape recording device.

SUMMARY OF THE INVENTION

The present invention relates to a method for writing data on a magnetic tape. The method includes a step of causing a user to select data to be recorded on a magnetic tape, a step of reading out an attribute written on the magnetic tape, and a step of writing the selected data on the magnetic tape with the same attribute as that read out in the second step.

According to the present invention, the attribute of the data to be newly written is the same as the attribute of the data written previously. Thus, the magnetic tape can be handled as being set to a mode in which only one attribute is permitted for writing. Multiple kinds of attributes can be set as data attributes in accordance with importance of data or how to use the data. The user may properly select a backup state of the data on the magnetic tape in conformity with the importance of the data. For example, it is possible to prevent written data from being deleted by selecting an attribute which prohibits data overwriting so that the magnetic tape is permitted only writing with that attribute. Further, an access to the written data by any unauthorized person can be prevented by selecting an attribute which requires input of a code number or password to access the written data.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
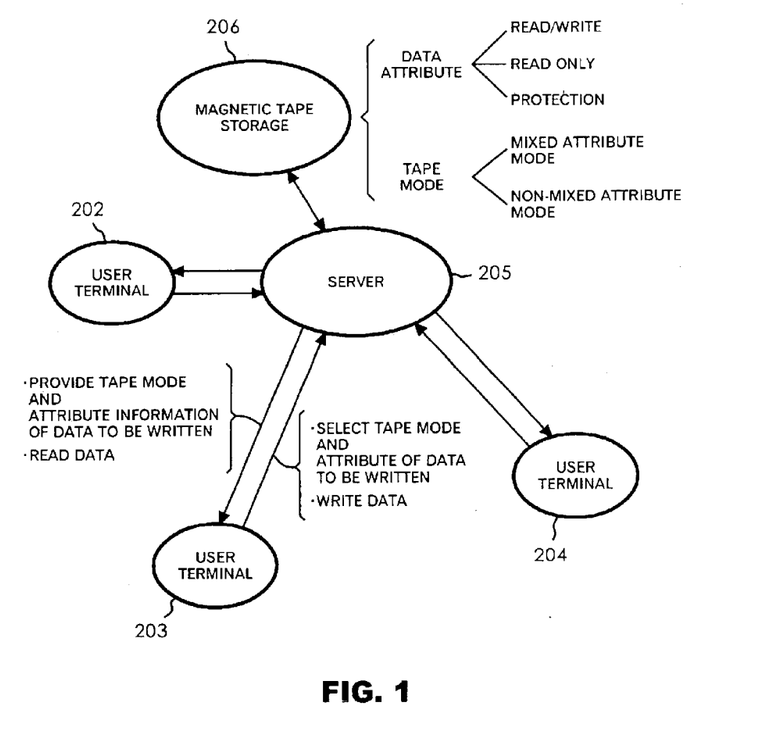
FIG. 1 illustrates a network to which the data recording method of the present invention can be applied.
Figure 2:
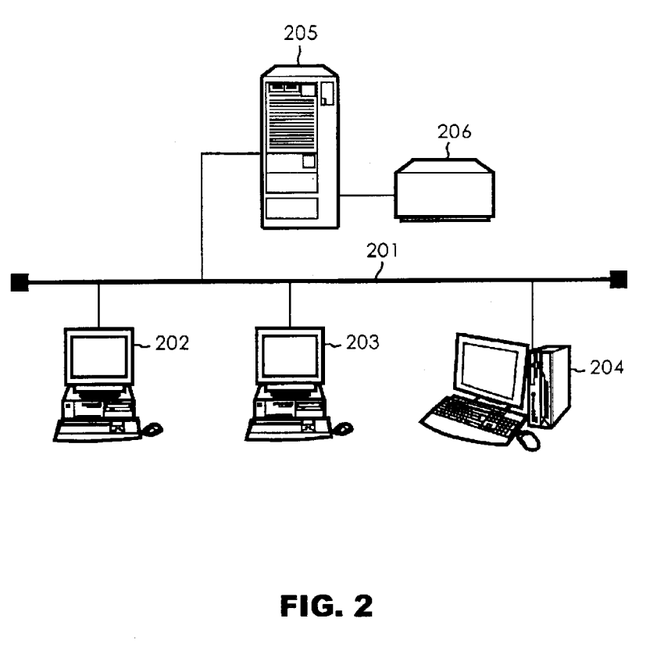
FIG. 2 illustrates a network to which the data recording method of the present invention can be applied.

FIGS. 1 and 2 schematically show a network to which a data recording method of the present invention is applied. The network shown in FIGS. 1 and 2 includes a local-area network (LAN) 201, user terminals 202, 203 and 204, a server 205 and a magnetic tape recording device or storage 206. The LAN environment shown in FIGS. 1 and 2 may be implemented in, for example, a building, a main office, a branch office, a laboratory, or a factory.

LAN 201 provides a network environment using the well-known Transmission Control Protocol/Internet Protocol (TCP/IP) protocol. LAN 201 may use Ethernet, Token Ring, Fiber Distributed Data Interface (FDDI) or the like. The network may be wired, wireless or combination thereof. The user terminals 202, 203 and 204 are connected to the LAN network 201 using the TCP/IP protocol. Each of the user terminals 202, 203 and 204A may be any computer having basic functions of a conventional personal computer.

A server 205 is a NAS that contains a large-capacity hard disk drive and has a centralized management function for mass storage. The server 205 also has a function of controlling the operation of the magnetic tape storage 206 described later, and a function for recording and executing Graphical User Interface (GUI) software that enables users to carry out operations using the user terminals 202, 203 and 204 described later. A basic Operating System (OS) that can operate the GUI is installed in each of the user terminals 202, 203 and 204.

For example, when LAN 201 is an in-house LAN built in an office building, the server 205 conducts centralized management for accounting data, customer data, sales data, etc. When LAN 201 is built in a factory, the server 205 conducts centralized management for order data of products, delivery date data of manufactured goods, cost data of parts, process control data, yield ratio data of products, test data of products, inventory data of parts, inventory data of products, etc.

The magnetic tape storage 206 has a function of backing up data to be handled by the server 205. The magnetic tape storage 206 is equipped with multiple cartridge-type magnetic tapes any one of which can be selected by a user instruction. The magnetic tape storage 206 includes a magnetic tape drive, a drive controller and a magnetic head (not shown), and has a function of writing data on and reading data from the magnetic tape. Further, the magnetic tape storage 206 has a well-known function of deleting data written at positions subsequent to overwritten data due to the data overwriting operation. The magnetic tape storage 206 has also functions of writing data having one of the attributes described later, and setting a loaded magnetic tape to a mode described later.

In the present embodiment, a user can select one of two modes for a magnetic tape, which are mixed attribute and non-mixed attribute modes described later.

Data backup can be carried out at any interval that is set at user's convenience, such as every day or every week. Even if data recorded in the server 205 are lost due to an unforeseen accident, the backup could minimize the data loss. Although data to be backed up are not specifically limited, the above-described data handled by the server 205 may be backed up. A relationship between attributes of data and possible operations according to this embodiment is shown in the following Table I.

TABLE I

| OPERATION | ATTRIBUTE | | |
|---|---|---|---|
| | READ/WRITE | READ ONLY | PROTECTION |
| OVERWRITING | possible | impossible | possible with ID and password |
| WRITING IN FREE AREA | possible | possible | possible with ID and password |
| RESTORE | possible | possible | possible with ID and password |

In the present embodiment, three attributes shown in Table I can be set to data to be recorded on the magnetic tape in the magnetic tape storage 206. These attributes are "read/write," "read only" and "protection."

The "read/write" attribute is defined as the one which, under the state that data having this attribute have already been written on a magnetic tape, permits data restoring, overwriting with new backup data, and data writing in a free area to be performed without limit. The free area is an area on a magnetic tape containing no written data and positioned subsequently to an area in which last data are written under the state that data are sequentially written in successive areas on the magnetic tape.

The "read only" attribute is defined as the one which, under the state that data having this attribute have already been written on a magnetic tape, permits data restoring and data writing in a free area to be performed without limit, but prohibits overwriting any written data with new backup data.

The "protection" attribute is defined as the one which permits data overwriting, data writing in a free area, and data restoring to be performed only when a user ID and a user password are input.

In the magnetic tape storage 206, magnetic tapes each having either the mixed attribute mode or the non-mixed attribute mode are housed, from which the user can properly select a magnetic tape having a desired mode.

The mixed attribute mode permits multiple attributes to coexist in a single magnetic tape. In the mixed attribute mode, for example, data having the "protection" attribute can be written subsequently to data having the "read/write" attribute on a magnetic tape. On the other hand, in the non-mixed attribute mode, only one attribute is permitted for data to be written on a magnetic tape. In the non-mixed attribute mode, the attribute of data which are first written on the magnetic tape determines the attributes of data to be subsequently written. For example, if the attribute of data written first on a magnetic tape is "read only", only data having the "read only" attribute are permitted to be written subsequently on the magnetic tape. Information for identifying the mixed attribute mode and the non-mixed attribute mode is contained in header information of data recorded at a first position of a magnetic tape.

A. BACKUP EXAMPLE 1

Figure 3:
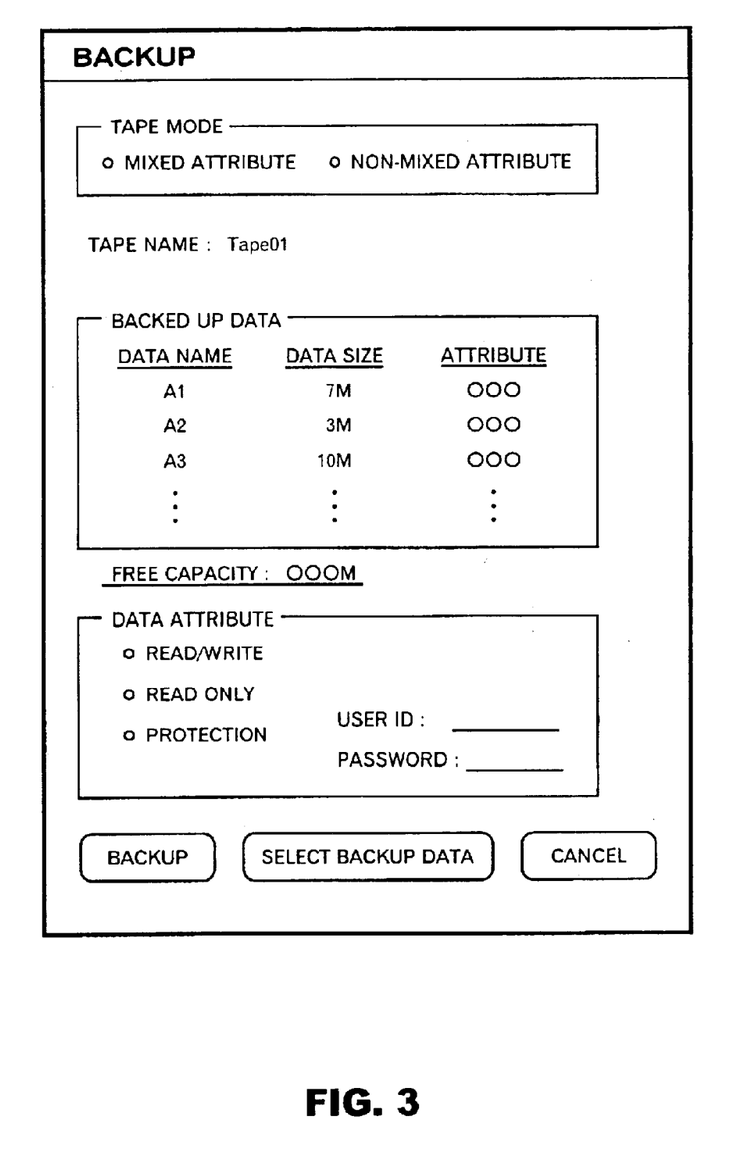
FIG. 3 illustrates a first screen displayed on a user terminal in accordance with a preferred embodiment of the present invention.
Figure 4:
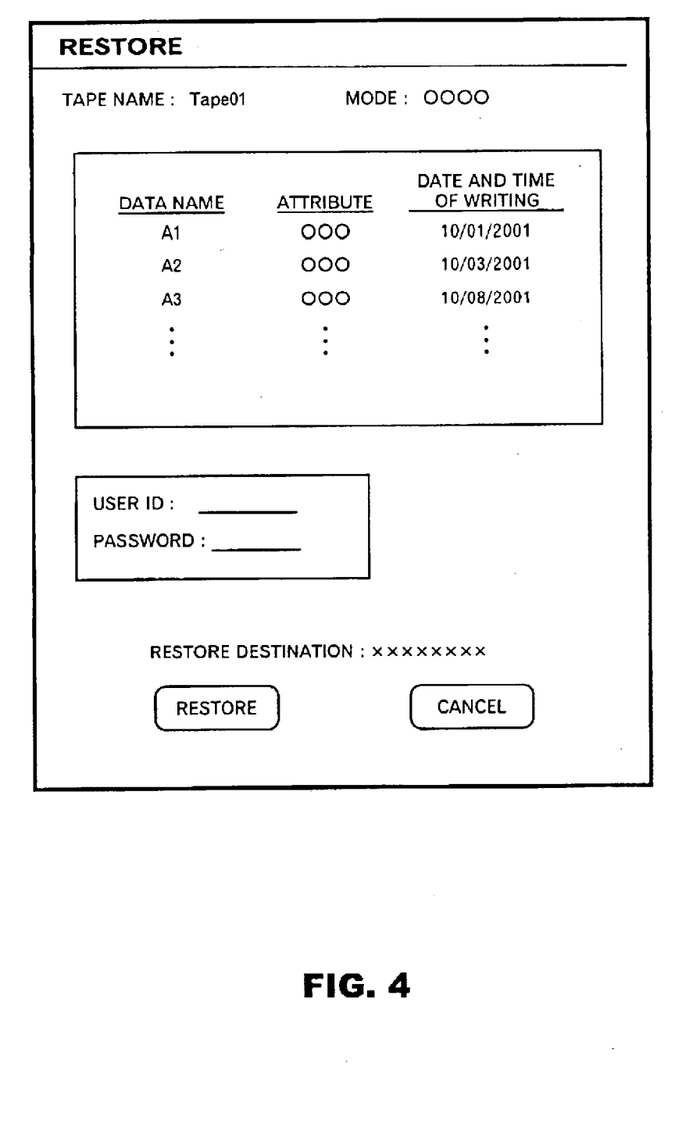
FIG. 4 illustrates a second screen displayed on the user terminal in accordance with a preferred embodiment of the present invention.
Figure 5:
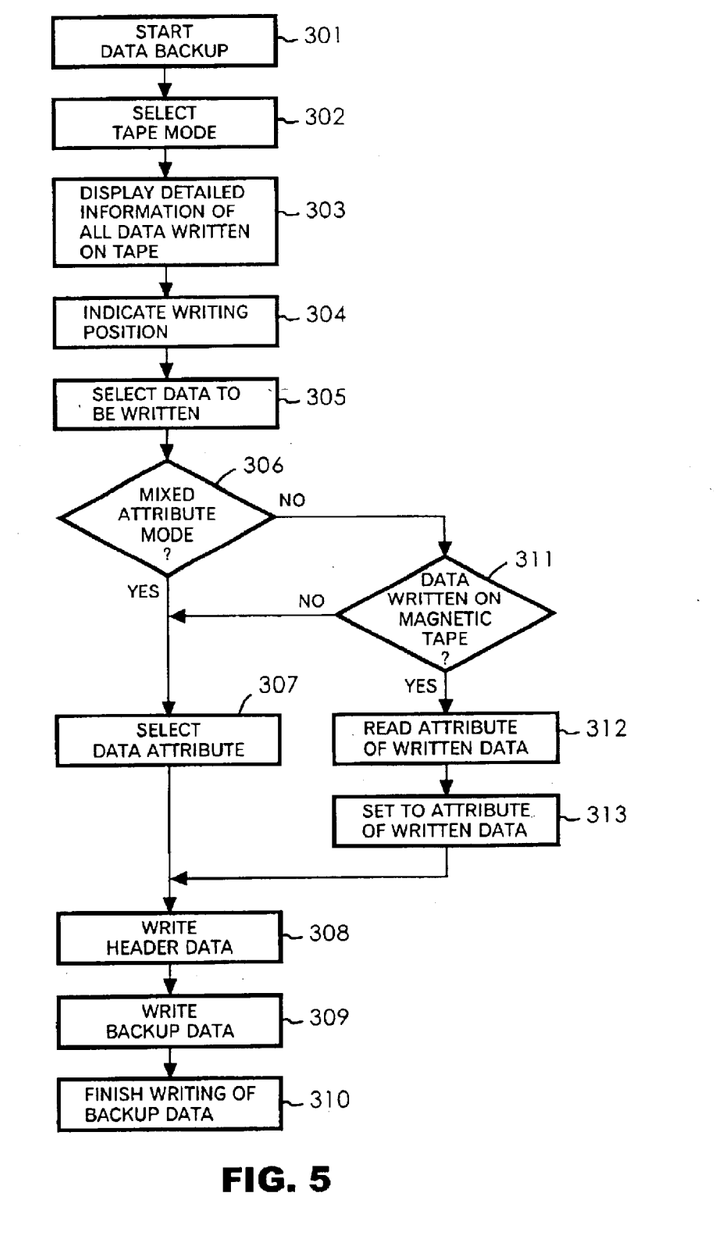
FIG. 5 is a flowchart of a method for writing data in accordance with a preferred embodiment of the present invention.

An example of data overwriting on a magnetic tape having the non-mixed attribute mode on which data have already been written will be described below. FIG. 3 illustrates a backup screen displayed at a user terminal in one embodiment to which the data recording method of the present invention is applied. FIG. 4 illustrates a restore screen displayed at the user terminal in one embodiment to which the data recording method of the present invention is applied. FIG. 5 shows an exemplary flowchart for explaining one embodiment to which the data recording method of the present invention is applied.

The procedure described below is carried out according to the flowchart of FIG. 5. The procedure is recorded in a recording device of the server 205, and read out and executed by a processor (not shown) in the server 205. First, a user calls the screen of FIG. 3 from the server 205 by operating the user terminal 203, and starts a data backup operation (step 301). Then, the user selects the non-mixed attribute mode as a tape mode (step 302). The selection of the tape mode is carried out, for example, by clicking a "non-mixed attribute" button on the screen of the user terminal 203.

When the tape mode is selected by the user, the server 205 reads the header data written at the beginning of each magnetic tape housed in the magnetic tape storage 206 to select a magnetic tape having the non-mixed attribute mode. When multiple magnetic tapes having the non-mixed attribute mode are housed in the magnetic tape storage, selection of a magnetic tape is carried out after step 302.

Further, the server 205 reads the header data of the data written at the beginning of the magnetic tape. The server 205 displays the read information as detailed information of all the data written on the magnetic tape on a display of the user terminal 203 in a manner illustrated in FIG. 3 (step 303). The non-mixed attribute mode can be identified from the header data of the data recorded at the beginning of the magnetic tape.

As illustrated in FIG. 3, the detailed information contains a tape name, and names, sizes and attributes of backed up data. Further, a free or writable capacity remaining on the magnetic tape is also displayed together with the detailed information. The user who operates the user terminal 203 can check the state of data written on the magnetic tape by viewing the detailed information of the written data displayed on the screen of FIG. 3.

The user checks the above detailed display, and selects a data writing position (step 304). That is, the user selects which displayed data are to be overwritten (step 304). Such selection can be carried out by moving a cursor to a selected portion and clicking it. Then, the user selects data to be backed up by overwriting (data to be written) from a recording device such as a hard disk drive disposed in the server 205 (step 305). In this selection, the user can use a "select backup data" button to select the overwriting data from another data file (not shown). Following step 305, the server 205 judges whether the mode selected in step 302 is the mixed attribute mode or not (step 306). In this example, the non-mixed attribute mode has been selected in step 302, and thus the decision of step 306 is false that causes a branch to step 311. In step 311, the server 205 determines whether data are written on the selected magnetic tape. In this example, a magnetic tape on which the data have been written is selected, so that the judgment of step 311 is true.

Next, the server 205 reads a data attribute from the header data of the data written at the beginning of the selected magnetic tape (step 312). If the read data attribute is "protection", the server 205 prompts the user to input a user ID and a password on the display of the user terminal 203. The user ID and the password correspond to the written data which are to be overwritten. Accordingly, others who do not know the user ID and the password of the written data cannot go to the subsequent steps. When the read data attribute is "read only", an error is indicated.

Next, the server 205 sets an attribute of the data selected in step 305 to the attribute read in step 312. The user checks the selected and inputted items on the screen of FIG. 3 and, if there is no problem, clicks the backup button on the screen of FIG. 3 to instruct execution of the backup. In response to this instruction, the server 205 overwrites the specified data on the magnetic tape. That is, the server 205 first writes the header data of the backup data (step 308), and then writes the backup data (step 309). Thus, the writing of the backup data by the overwriting operation is finished (step 310). In this example, the header data contains the tape mode and the data attribute. When "protection" is selected as the attribute, the header data further contains the user id and the password.

Figure 8:
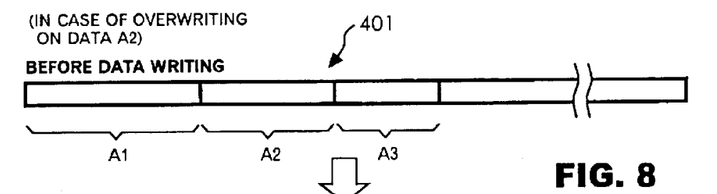
FIG. 8 illustrates a state that data are written on a magnetic tape in one embodiment to which the data recording method of the present invention is applied.
Figure 9:
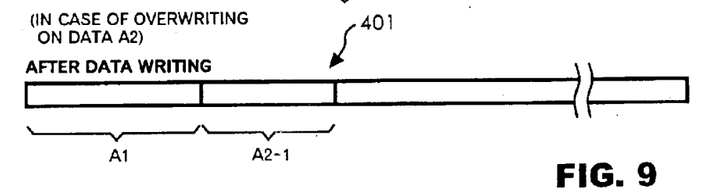
FIG. 9 illustrates a state that data are written on a magnetic tape in one embodiment to which the data recording method of the present invention is applied.

The above data writing procedure will be described further with reference to FIGS. 8 and 9. It is assumed here that the data A2 which has been written on the magnetic tape 401 are overwritten. In this example, the data A1 to A3 having the same attribute have been written on the magnetic tape 401 before the data writing is carried out (FIG. 8). Then the data A2 recorded on the magnetic tap 401 are overwritten with the backup data having the same attribute as the data A1 to A3. In FIG. 9, the data A2 thus overwritten is replaced with data A2-1. Further, the data A3 are deleted due to the overwriting of the data A2.

B. BACKUP EXAMPLE 2

In this example, it is assumed that the backup data are written on a magnetic tape having the non-mixed attribute mode on which no data are written. In this case, writing of the backup data is the first writing operation for the magnetic tape. The user operates the terminal 203 to start the data backup operation (step 301), and selects the non-mixed attribute mode as a tape mode (step 302). In response to this selection, the server 205 selects a magnetic tape having the non-mixed attribute mode which is housed in the magnetic tape storage 206. In this example, no data are written on the selected magnetic tape having the non-mixed attribute mode.

In response to the selection of the tape mode in step 302, the server 205 displays the detailed information of the selected tape on the screen shown in FIG. 3 with indication at the corresponding portion on the screen shown in FIG. 3 that no data are written (step 303).

In this example, since no data are written on the selected magnetic tape, the user indicates a beginning position of the magnetic tape as a data writing position (step 304). Next, the user selects data to be written (step 305). The server 205 then determines whether the mode of the magnetic tape selected in step 302 is the mixed attribute mode or not (step 306). In this example, since the non-mixed attribute mode is selected in step 302, the judgment of the step 306 is false. Next, the server 205 determines whether data have been written on the selected magnetic tape (step 311). Since the magnetic tape having no data written thereon is selected, the judgment of the step 311 is true.

Next, the user selects an attribute of the data selected in step 305 (step 307). When "protection" is selected as the attribute, the server 205 requests a user ID and a password to the user. If there is no problem in the selected and inputted items, the user clicks the backup button shown in FIG. 3 to instruct data writing to the server 205 (step 308). In response to this instruction, the server 205 writes header data (step 308), and further writes the backup data (step 309). The header data contains information indicating the non-mixed attribute mode. Thus, the writing of the backup data is finished (step 310).

Once the backup data is written, any data which will be subsequently written on the magnetic tape should have the same attribute as that of the first written data. For example, if "read only" has been selected as a data attribute, any data to be subsequently written must have the "read only" attribute. In this case, since the attribute prohibits overwriting, the attribute once written cannot be changed.

C. BACKUP EXAMPLE 3

In this example, it is assumed that data are written in a free area on a magnetic tape having the non-mixed attribute mode on which other data have been written. In this case, since the non-mixed attribute mode is set, data to be written in the free area should have the same attribute as that of the written data.

The user operates the terminal 203 to start the data backup (step 301), and selects the non-mixed attribute mode as a tape mode (step 302). In response to the operation of the user, the server 205 selects a magnetic tape set to the selected mode, and displays, on the screen shown in FIG. 3, information of data written on the magnetic tape (step 303).

Next, the user indicates a data writing position on the screen of FIG. 3. In this example, the user can indicate the data writing position by clicking an unoccupied portion below the written data on the screen of FIG. 3 (step 304). The user then selects data to be written on a screen (not shown) (step 305). In response to this operation, the server 205 determines whether the mode of the magnetic tape selected in step 302 is the mixed attribute mode or not (step 306). In this example, since the non-mixed attribute mode has been selected in step 302, the decision of the step 306 is false.

Next, the server 205 judges whether data are written on the selected magnetic tape (step 311). Since it is assumed in this example that data have been written on the magnetic tape, the decision of the step 311 is true. In response to the determine "YES" in step 311, the server 205 reads the attribute of data written at the first position of the magnetic tape, which is contained in its header data (step 312). If the attribute of the read data is "protection", the server 205 prompts the user to input a user ID and a password on the display of the user terminal 203. The user cannot go to the subsequent procedures unless the user inputs the user ID and the password.

Next, the server 205 sets the attribute of the data selected in step 305 to the same one as the data attribute read in step 312. The user checks the selected and inputted items on the screen of FIG. 3, and if there is no problem, the user clicks the backup button on the screen of FIG. 3 to instruct execution of the backup. In response to the instruction, the server 205 writes the data selected in step 305 in a free area on the magnetic tape. That is, the server 205 writes the header data of the selected data (step 308), and then writes the backup data (step 309). Thus, the writing of the backup data is finished (step 310).

The above writing procedure will be described with reference to FIGS. 6 and 7. In this example, before the data writing is carried out, the data A1 to A3 having the same attribute have been written on the magnetic tape 401. Data A4 are newly written in a free area subsequent to the data A3 recorded on the magnetic tape 401, with the same attribute as that of the data A1 to A3.

D. BACKUP EXAMPLE 4

In this example, it is assumed that the user writes data in a free area of a magnetic tape having the mixed attribute mode. First, the user operates the user terminal 203 to access the server 205 through the LAN 201 and invokes the backup operation screen shown in FIG. 3. This operation starts the backup operation of backup data (step 301). Next, the user selects, on the screen of FIG. 3, the mode of the magnetic tape on which the backup data will be written (the mixed attribute mode in this example) (step 302). In response to this selection, the server 205 reads header data written at the beginning of each magnetic tape in the magnetic tape storage 206, and selects a magnetic tape having the mixed attribute mode.

When the magnetic tape having the mixed attribute mode is selected, the server 205 displays detailed information of all data written on the selected magnetic tape at that time on the screen of FIG. 3 (step 303). Then, on the screen of FIG. 3, the user moves a cursor to a blank portion below data names which have been written, and clicks it to start the operation of writing new data in a free area. Through this operation, the writing position of the data is indicated (step 304). Next, the user uses the select backup data button to select a data file to be written or backed up on another screen (not shown) (step 305), and inputs a data name at the position previously indicated on the screen of FIG. 3 in step 304. Selected in step 305 are data handled in the server 205, and thus the data are read out from the hard disk drive in the server 205.

Then, the server 205 judges whether the mode of the selected magnetic tape is the mixed attribute mode or not (step 306). Since the mode selected in step 302 is the mixed attribute mode in this example, the decision of the step 306 is true.

Next, the user selects the attribute of the data to be written (step 307). The user may select the "read/write" attribute on the screen of FIG. 3, for example. Then, the user checks all the inputted items and clicks the backup button of FIG. 3. In response to this operation, the server 205 writes the header data in a free area on the magnetic tape (step 308), and subsequently writes the backup data (step 309). Thus, the writing of the backup data in the free area is finished (step 310).

An example of the above data writing operation will be described with reference to FIGS. 6 and 7. FIG. 6 shows a state that the data A1 to A3 have been written on the magnetic tape 401. FIG. 7 shows a state that the data A4 are further written in a free area after the state of FIG. 6.

Figure 6:
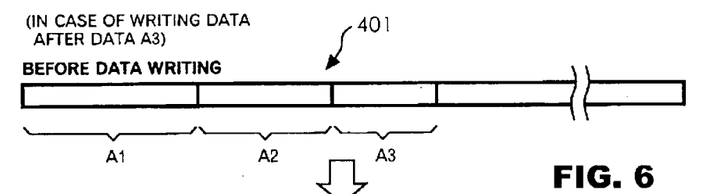
FIG. 6 illustrates a state that data are written on a magnetic tape in one embodiment to which the data recording method of the present invention is applied.
Figure 7:
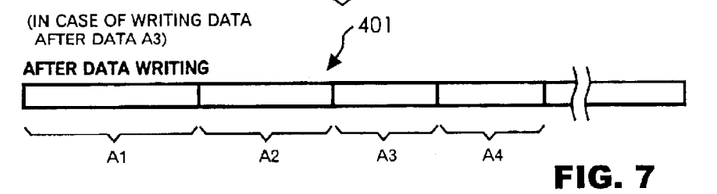
FIG. 7 illustrates a state that data are written on a magnetic tape in one embodiment to which the data recording method of the present invention is applied.

In the above example, the data A4 is written in the free area subsequent to the data A3 on the magnetic tape 401 having the mixed attribute mode on which the data A1 to A3 have been written as shown in FIG. 6, and thus the state shown in FIG. 7 is achieved. Since the magnetic tape 401 is set to the mixed attribute mode, the data A1 to A4 may have the same or different attributes.

E. BACKUP EXAMPLE 5

In this example, it is assumed that data which have been written on a magnetic tape having the mixed attribute mode will be overwritten. The user first selects a magnetic tape having the mixed attribute mode in step 302. After step 303, on the screen of FIG. 3, the user selects specific data to be overwritten which have been written on the magnetic tape. Through this operation, the data writing position (overwriting position) is indicated (step 304). If the attribute of the selected data (data to be overwritten) is "protection", the server 205 requests the user to input a user ID and a password. If the attribute is "read only", an error is notified.

Next, the user selects overwriting data (step 305). In response to this selection, the server 205 determines whether the mode of the magnetic tape selected is the mixed attribute mode or not (step 306). In this example, the decision of the step 306 is true. Thereafter, the user selects the attribute of the overwriting data (step 307). Since the magnetic tape on which the overwriting is to be conducted has the mixed attribute mode in this example, the overwriting data may have an attribute different from the attributes of the data which have been written on the magnetic tape.

When the user selects the "protection" attribute, the server 205 requests the user to input new user ID and password. If there is no problem in the inputted and set items, the user clicks the backup button on the screen shown in FIG. 3 to instruct the backup by the overwriting. In response to the instruction of executing the backup, the server 205 first writes the header data (step 308), and then writes the backup data (step 309). Thus, the writing of the backup data is finished (step 310).

In the above, the header data contains the mode of the tape and the attribute of the data. When the "protection" attribute is selected, the header data further contains the user ID and the password. The state of the data written through the above writing operation will be described with reference to FIGS. 8 and 9. FIG. 8 shows a state that the data A1 to A3 have been written on the magnetic tape 401. When the data A2 are overwritten with new backup data under this state, the state shown in FIG. 9 is achieved. FIG. 9 shows the state that the data A2 is changed to data A2-1 through the overwriting. Further, FIG. 9 shows the state that the data A3 of FIG. 8 has been deleted due to the overwriting of the data A2 of FIG. 8.

Since the above example assumes the mixed attribute mode, each of the data A1 to A4 may have any attribute.

F. RESTORING EXAMPLE

An example of restoring will be described below. FIG. 4 shows a screen displayed on the user terminal when restoring is carried out. In this example, the user operates the user terminal 203 to access the server 205, invokes a restoring screen of FIG. 4 to display it on the display of the user terminal 203. Then, the user selects a magnetic tape for restoring by indicating the name of the tape, for example. The server 205 displays a list of data recorded on the selected magnetic tape on the screen of FIG. 4. The user selects data to be restored from this display. If the attribute of the selected data is "protection", the server 205 displays on the display of FIG. 4 an indication requesting the user to input a user ID and a password.

If there is no problem in all items, the user specifies a restore destination on the screen of FIG. 4, and then clicks a restore button to instruct restoring of the selected data. In response to this instruction, the server 205 reads the data to be restored from the magnetic tape, and then writes the data in the restore destination.

In the above shown embodiments, the user can recognize the state of the data recorded on the magnetic tape at the time of the backup operation or the restoring operation at the user terminal which the user operates. By recognizing the state of the data which have been recorded, the user can judge importance of the data or priorities of the data to be left as backup data. Accordingly, it is possible to prevent occurrence of an accident that important backup data are deleted due to careless backup or restoring, which would lead to database corruption.

When the attribute of the data written is "read only", no overwriting can be carried out, so that it is possible to prevent such a situation that written data are deleted due to overwriting. Further, with respect to data having high importance, it is possible to achieve a backup state of the data with lower risk of deletion by setting the mode of the magnetic tape to the non-mixed attribute mode, and the attribute of the data to be written to "read only".

Also, by setting the attribute of the data to "protection", only a specific user is permitted to access the data, and thus security for data protection is enhanced. Particularly, it is possible to achieve a backup state of the data with lower risk of deletion by a third person by setting the magnetic tape to the non-mixed attribute mode and the attribute of data to be written to "protection". Further, in the above-shown embodiments, even when data having the "read only" attribute prohibiting overwriting are written on the magnetic tape, a free area can be used.

Further, in the above-shown embodiments, plural magnetic tapes may be provided each of which has a selectable tape mode. By utilizing this, the user can perform flexible operations in which data which should never be lost are written on a magnetic tape having the non-mixed attribute mode with the attribute of the data being set to "read only", while data to be backed up for the present are written on a magnetic tape having the mixed attribute mode with the attribute being selected properly.

According to the above-shown embodiments, it is possible to construct a data backup system which can prevent occurrence of an accident that important data are lost, enhance secrecy of data, if necessary, and further effectively use the magnetic tape, by properly selecting the data attribute and the tape mode. Further, according to the embodiments, it is possible to properly select a data backup method depending on a data handling manner.

The above operation is carried out by using GUI. Since the information on the data attribute and tape mode is recorded on the magnetic tape, there is no cumbersome operation as compared with the one found in the conventional magnetic tape storage. All the setting operations can be performed through the GUI provided from the server. This is significant from the viewpoint of usability for the user. Further, the above operation does not need cumbersome proceedings such as communications with the administrator, checking, etc. for the backup operation even when the server and the magnetic tape storage are placed remotely from the user.

The above-shown embodiments may be implemented by developing software for executing the above procedure, which can be realized at low cost. This point further enhances the superiority of the magnetic tape storage which is originally low in cost per recording capacity.

In the above-shown embodiments, the magnetic tape storage may be equipped with plural magnetic tapes having the same mode. For example, it may be equipped with two magnetic tapes having the non-mixed attribute mode, one of which is exclusively used for data having the "read only" attribute while the other is exclusively used for data having the "protection" attribute. This allows the user to properly use the magnetic tapes, for example, the former magnetic tape is used for data which should not be overwritten while the latter magnetic tape is used for data which can be accessed from only a specific person, so that a backup method suited to a given data type can be implemented.

Also, while the above-shown embodiments have been described in which the attribute is read out from the header data of the first data on the magnetic tape in step 312, the attribute may be read out from the header data of any data written on the tape in step 312. While the present invention has been specifically described with reference to the embodiments thereof, the present invention is not limited to the above embodiments, and can be modified without departing from the gist thereof.

For example, while three user terminals are shown in FIGS. 1 and 2, the number of the user terminals is not limited to three. Usually, a larger number of user terminals are connected to the LAN 201. The server 205 is not limited to NAS, and any server having the function of providing required services may be selected properly. Further, a mail server, a communication server, a print server, a printer, etc. may be connected to the LAN environment shown in FIGS. 1 and 2. Also, a printer, a scanner, etc. may be connected to any user terminal.

The magnetic tape storage may have a configuration in which only one magnetic tape can be used, or while only one magnetic tape can be used, it can be replaced with a new magnetic tape when the free capacity of the tape becomes too small.

In the configuration in which only one magnetic tape can be used, the user may not freely select the mixed attribute mode or the non-mixed attribute mode. For example, when data having the "protection" attribute have been written on a tape having the non-mixed attribute mode, data having the "read only" attribute cannot be written subsequently thereto. In order to overcome this inconvenience, magnetic tape storage dedicated to the mixed attribute mode and the non-mixed attribute mode, respectively, may be separately provided, and the selection thereof may be controlled by the server. Alternatively, plural magnetic tape storage dedicated to the non-mixed attribute mode may be provided, and the selection thereof may be controlled by the server.

Also, while the embodiments utilizing the LAN environment have been described, the present invention may be applied to a larger network environment. For example, the present invention may be applied to a data backup system in a domestic or worldwide network of a specific company or organization.

In the above-described embodiments, the user performs the data backup operation by using the GUI displayed on the screen of the user terminal. However, any equipment that can perform the same function as that described in the above embodiments may be used as a terminal operated by the user. For example, a PDA or a cellular phone may be used as a terminal operated by the user.

The data attribute is not limited to those described in the embodiments, and various attributes can be set, such as a "read only/protection" attribute which prevents data from being accessed or overwritten unless a user ID and a password are inputted, and an attribute which requires inputting of a user ID and a password when restoring is carried out.

While the invention has been particularly shown and described with reference to a preferred embodiment, it will be understood by those skilled in the art that various changes in form and detail may be made therein without departing from the spirit and scope of the invention.

What is claimed is:

1. A method for writing data on a magnetic tape, said method comprising the steps of:
    prompting a user to select data to be recorded on a magnetic tape;
    reading out an attribute of data recorded on said magnetic tape; and
    writing said selected data on said magnetic tape with an attribute identical to said attribute read previously.

2. The method of claim 1, wherein said attribute is contained in header data of said data written on said magnetic tape.

3. The method of claim 1, wherein said attribute prohibits data overwriting or permits said data overwriting under a condition of inputting a code number.

4. The method of claim 1, further comprising a step of providing information on said attribute to said user.

5. The method of claim 1, wherein said attribute of said data further includes an attribute having no restriction to said data overwriting.

6. The method of claim 1, further comprising a step of causing a user to select any magnetic tape from a plurality of magnetic tapes.

7. The method of claim 6, wherein each of said magnetic tapes is permitted to be written with only data having one attribute or data having different attributes.

8. A data recording system for writing data on a magnetic tape, said data recording system comprising:

means for prompting a user to select data to be recorded on a magnetic tape;

means for reading out an attribute of data recorded on said magnetic tape; and means for writing said selected data on said magnetic tape with an attribute identical to said attribute read previously.

9. The data recording system of claim 8, wherein said attribute is contained in header data of said data written on said magnetic tape.

10. The data recording system of claim 8, wherein said attribute prohibits data overwriting or permits said data overwriting under a condition of inputting a code number.

11. The data recording system of claim 8, further comprising means for providing information on said attribute to a user.

12. The data recording system of claim 8, wherein said attribute further includes an attribute having no restriction to said data overwriting.

13. The data recording system of claim 8, further comprising means for causing a user to select any magnetic tape from a plurality of magnetic tapes.

14. The data recording system of claim 13, wherein each of said magnetic tapes is permitted to be written with only data having one attribute or data having different attributes.

15. A computer program product residing on a computer usable medium for writing data on a magnetic tape, said computer program product comprising:

program code means for prompting a user to select data to be recorded on a magnetic tape;

program code means for reading out an attribute of data recorded on said magnetic tape; and program code means for writing said selected data on said magnetic tape.

16. The computer program product of claim 15, wherein said attribute is contained in header data of said data written on said magnetic tape.

17. The computer program product of claim 15, wherein said attribute prohibits data overwriting or permits said data overwriting under a condition of inputting a code number.

18. The computer program product of claim 15, further comprising program code means for providing information on said attribute to a user.

19. The computer program product of claim 15, wherein said attribute further includes an attribute having no restriction to said data overwriting.

20. The computer program product of claim 15, further comprising program code means for causing a user to select any magnetic tape from a plurality of magnetic tapes.

21. The computer program product of claim 20, wherein each of said magnetic tapes is permitted to be written with only data having one attribute or data having different attributes.

22. A data recording system comprising:

means for writing on a magnetic tape data having an attribute that restricts data overwriting; and means for setting said magnetic tape to a mode that permits writing of data having an identical attribute only.

* * * * *